April 18, 1967 D. T. BERGMAN 3,314,278
FORGING PROCESS AND PRODUCT THEREFROM
Filed March 3, 1964 2 Sheets-Sheet 1

INVENTOR.
DANIEL T. BERGMAN
BY
Owen, Wickersham & Erickson
ATTORNEYS

April 18, 1967  D. T. BERGMAN  3,314,278
FORGING PROCESS AND PRODUCT THEREFROM
Filed March 3, 1964

INVENTOR.
DANIEL T. BERGMAN
BY
Owen, Wickersham & Erickson
ATTORNEYS

United States Patent Office 3,314,278
Patented Apr. 18, 1967

3,314,278
FORGING PROCESS AND PRODUCT THEREFROM
Daniel T. Bergman, 64 Deer Park Ave.,
San Rafael, Calif. 94901
Filed Mar. 3, 1964, Ser. No. 348,967
1 Claim. (Cl. 72—377)

This invention relates to an improved method for manufacturing high strength irregular shaped one-piece metal components and for the products produced by the method.

Forging, generally defined as a process of forming metal by means of heat and pressure has long been used where high strength, toughness and durability in parts is desired. My invention overcomes a serious problem which arose in the forging of relatively large irregular shaped members, and particularly those made from certain alloys of aluminum and magnesium. Such forgings are commonly used in the construction of high load bearing components in aircraft and other space type vehicles where the high strength-to-weight ratio is a critical design criteria. On aircraft these components are subjected not only to extremely high static loads but often also to tremendous dynamic or shock loads as, for example, the various components of an aircraft landing gear assembly.

Forgings produced prior to the present invention had a tendency to fail in certain areas and such failures were often unpredictable with respect to the age of the forging and the stress exerted on it. For example, certain forgings of an aluminum alloy commonly used for aircraft construction were particularly susceptible to failure due to a phenomenon called stress corrosion. A metallurgical analysis of fittings formed by the conventional forging process used heretofore established that the aforesaid component failures consistently occurred in regions where the grain structure of the part produced flowed transversely within the part towards its sides and to the surface and thus formed seams along its sides. These seams or transverse flow areas were produced during the forging of the part, and was established that they not only created an inherently weak area subject to failure understress, but they were also greatly subject to the aforementioned stress corrosion which caused cracks to occur at any time, even when the part was not under stress.

With the foregoing background, it is therefore one principal object of my invention to provide an improved method for making forged metal products of a predetermined shape which have greater strength, reliability and durability.

More specifically, another object of my invention is to provide an improved forged metal part of a predetermined irregular shape and a method for making the same wherein the internal grain flow pattern is generally longitudinal within the part and follows substantially parallel to its surface contours rather than forming areas of short transverse flow. In other words, my main objective is to provide an improved forging method that eliminates the metal grain seams along the sides of the component and also the extensive recrystallization and grain growth that occurred due to the short transverse flow which occurred in parts made by the prior art method.

Still another object of my invention is to provide a method for making a strong durable forging of aluminum alloy material without the need for employing additional heat treating procedures to remove or reduce the possibility of stress corrosion within the forging.

Another further object of the invention is to provide a method for forging an irregular, generally cylindrical shaped, aluminum alloy or magnesium component wherein the die members are held together tightly so that no material can flow outwardly from the die cavity along the sides of the component during the forging process and all excess material can escape only from the forging die cavity by flowing generally axially with the forging ram at one end of the die cavity.

In forging procedures heretofore employed, a pair of die members with open cavities were utilized. A heated slug or billet of the material being formed was placed between the dies and they were then brought together with the force required to shape the material and form it into the configuration of the die cavities. During the forming action of the die members a portion of the material called flashing flowed transversely outwardly from between the die members at the sides of the component. This release of excess material from the sides of the die caused a short transverse flow to take place within the forged part and created an internal grain flow pattern extending from within the part to its side surfaces. These areas of short transverse flow terminating in surface seams along the sides of the forged part created an inherently weakened portion subject to internal residual stresses and stress corrosion. In accordance with the present invention, these weakened areas of short transverse grain flow are eliminated by a method wherein both die members are first brought together and held or are permanently joined together in a rigid fixed position before the forging takes place. The heated billet of material is then rammed through an opening into one end of the cavity between the fixed die members. If the part being made has a recessed portion the ram penetrates through the opening into the cavity as the excess material flows generally axially within the die cavity, past the ram and out the die opening. The resultant product is a flashless forging with no inherent weak areas and one that is not subject to unpredictable cracks or failures.

When the die members are placed together with their edges around their respective cavities in abutment, the junction of the mating die members invariably will create a line or some irregularity or indentation along the length of the part. Therefore, another object of my invention is to eliminate any loss of strength in the product due to the creation of the aforesaid line or irregularity by the mating die members. This is accomplished by providing the die members which produce a bead on the part being made during the forming process. This bead thus extends around the entire part except for the die cavity opening at one end. Any irregularity or indentation due to misalignment of the die members during the forging process occurs on the bead and not on the main body surface of the part. After the forged part is removed from the die members, the bead is ground down to a minimum thickness, thereby removing the indentation or line which ordinarily would cause an area of stress concentration and thereby weaken the part.

Other objects, advantages and features of the invention will become apparent from the following detailed description presented in accordance with 35 U.S.C. 112.

The method of forging according to the principles of the invention solves problems related to the forging of relative light metals such as aluminum and magnesium and particularly for components made of the recently developed aluminum alloys commonly used in aircraft and missile construction such as the aluminum alloy 7075. In broad terms my method comprises a first step of forming a die cavity having a predetermined generally irregular shape with an opening at one end, and then the second step of forcing a heated slug or billet of material capable of flowing under pressure into the die cavity so that the flowing material assumes the internal shape of the die cavity. In my method the die members are abutted together in a fixed position, and they remain together during the forming process. Thus, there is no flow of material from the sides of the die and thus no short transverse flow of material occurs internally within the part being formed. Any excess of material from the original slug is caused to flow axially through the one die opening.

Figure 1:
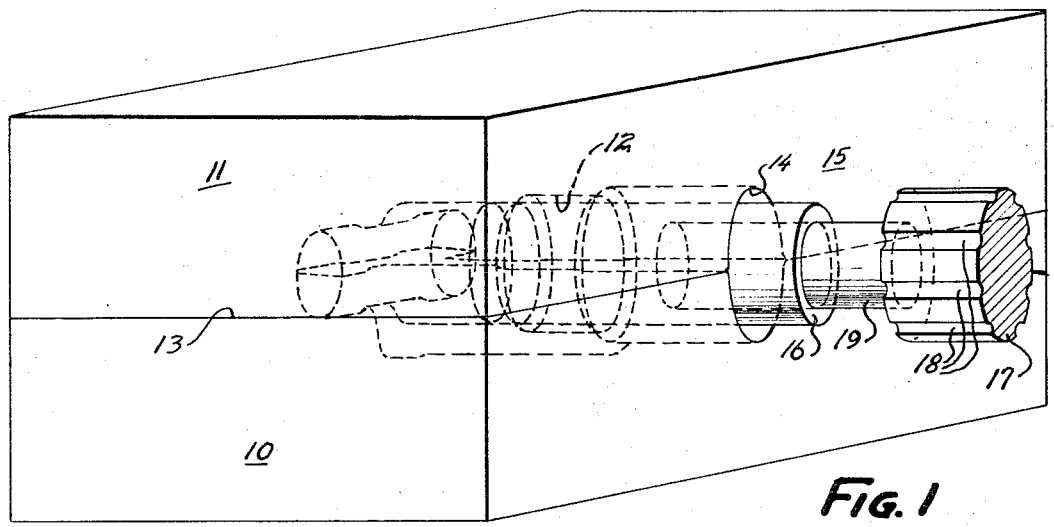
FIG. 1 is a schematic view in perspective showing the first step of the method according to the invention.

Describing the invention in greater detail now with reference to the drawings, FIG. 1 shows a pair of rigid die members 10 and 11 which are arranged together in abutment. Each die member has a cavity 12 that has been formed with the desired shape and extends below a plane surface indicated by the line 13, which abuts a similar surface on the other die member. The cavities of the abutting die members may have any shape depending on the part being produced. The shape of the cavities for the die member 10 and 11 are merely for illustrative purposes and are not intended to be limiting to the scope of the invention. At one end each die member has a semi-cylindrical recess 14 that extends from the cavity across the plane surface 13 to an outer wall surface 15. When the two die members are placed together with their plane surfaces abutting, their recesses 14 together form a cylindrical opening to the internal die cavity 12. The die members are held firmly in this abutting position by a suitable press or fixture (not shown).

Figure 2:
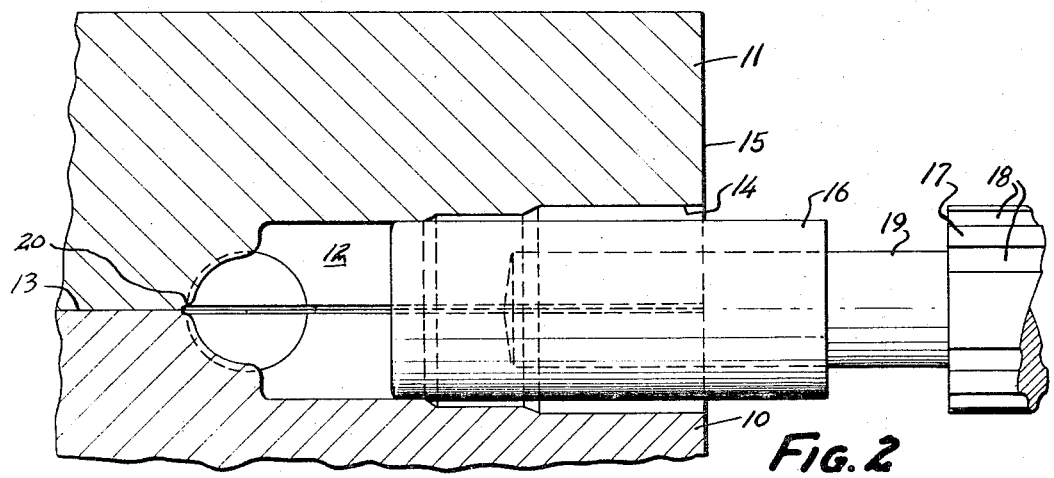
FIG. 2 is a fragmentary view in elevation and in section showing the second step according to the invention.

With the die members held together, a slug or billet 16 of material such as aluminum alloy having a generally cylindrical shape is positioned adjacent to and in alignment with the die opening 14, as shown in FIG. 2. The material is pre-heated to a level just below its critical temperature and generally to a temperature not greater than 50° F. where the metal is easily formable and a consistent internal grain flow pattern will be established internally as the material readily takes the shape of the die cavity 12 when forced into it.

Figure 3:
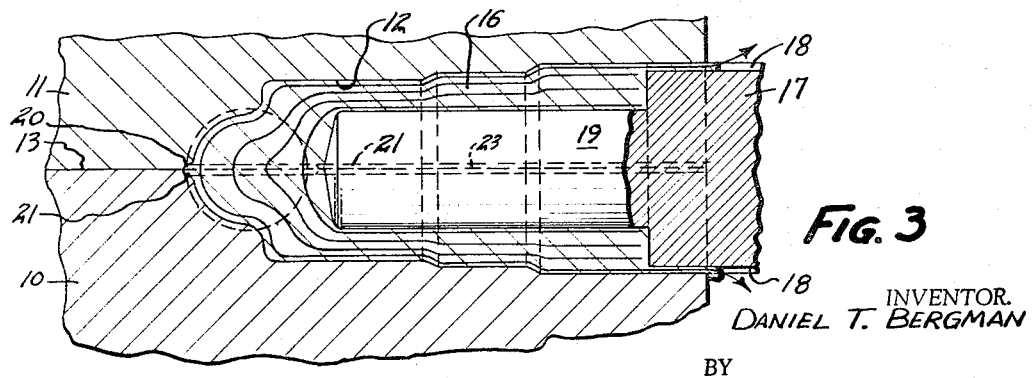
FIG. 3 is a view in elevation and in section showing the third step according to the invention.

Aligned with the die opening 14 and thus also with the billet 16 of formable material is a ram or plunger 17 which may be movable axially by any suitable means. The ram is somewhat smaller in diameter than the die opening 14 and spaced apart along its surface are a series of grooves 18. The ram may have a section 19 of a reduced diameter at its head end for forming a recess in the forged part. When operated, as shown in FIG. 3, the ram 17 forces the slug of material 16 through the die opening 14 and into the cavity 12. Near the end of the ram stroke, as the slug of material fills the die cavity the flow of material follows the surface contours of the cavity and becomes substantially longitudinal therein. Arrows are superimposed on the drawing, FIG. 3, to show this longitudinal flow. Any excess material from the billet moves axially along the ram 17 within the grooves 18 provided in its surface.

The die members may be made so that the excess material from the billet will not flow out through the die opening but will merely become a prolongation of the forging which can be cut off after removal from the die cavity. In some instances a billet may be provided having exactly the volume of the forged part being formed, and in such a case no excess material is formed near the die cavity opening. Whether or not any excess material is formed during the forging operation, the aforesaid method wherein the die members are abutted together to form a die cavity with only one opening for the ram produces a forging with an uninterrupted generally longitudinal grain pattern having no short transverse flow.

An important feature of my forging method is that all of the finished arts produced thereby are absolutely smooth and free from any surface defects or indentations which could become "stress raisers" and cause a structural failure or in effect reduce the strength of the part. Normally, when two mating die members are placed together it is a practical impossibility to align them so that edges of each cavity match perfectly. The misalignment of the edges around the cavities of the abutting dies would always cause an indentation or a crease along the surface of the forged part. In any structural component such a surface irregularity could have the same effect as a deep scratch which could start a crack and would be a source of stress concentration. In the present invention the edges around the cavities of each die member are beveled off or indented as indicated by the numeral 20 in FIG. 2. Thus, when the slug of material is forced into the die cavity 12 it flows into the beveled edge areas within the die cavity 12 and forms a bead 21 that extends entirely around the forged part except at the end portion that was engaged by the ram 17.

Figure 4:
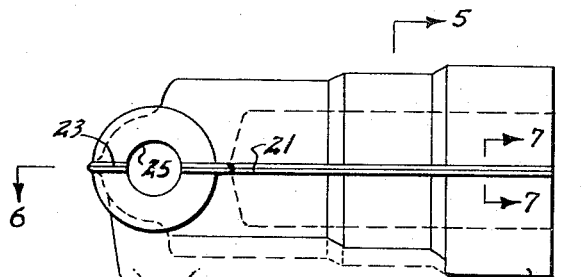
FIG. 4 is a view in elevation showing a typical forged part made in accordance with the invention after having been removed from the fixed forging dies.
Figures 7, 7A:
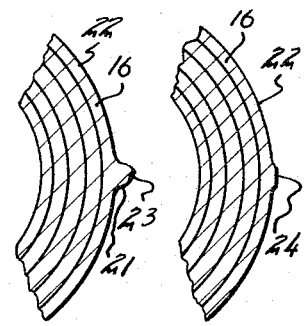
FIG. 7 is an enlarged fragmentary view in section taken along the line 7—7 of FIG. 4 showing the bead portion of the forged part.
FIG. 7a is an enlarged fragmentary view in section showing the bead portion of FIG. 7 after it has been ground down to a smooth surface.

FIG. 4 shows a typical forged part 22 just after being removed from the die members 10 and 11. It has the characteristic line or indentation 23 caused by the abutting dies. However, this line will always be present only on the bead 21 formed thereby by the die members 10 and 11. The line imperfection 23, a source of structural weakness, is shown typically in the enlarged cross-sectional view of FIG. 7. This line 23 can now be removed by grinding down the bead 21 until it is entirely smooth (see FIG. 7a), leaving only a smooth slightly raised surface 24. Other necessary machining work can now be performed on the forged part such as the boring and reaming of holes such as the hole 25 or the facing of various bearing surfaces.

Figure 5:
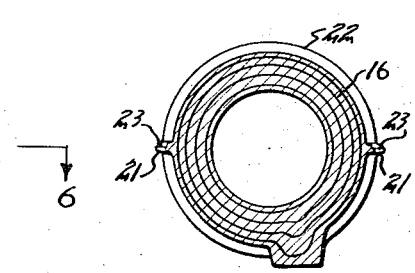
FIG. 5 is a view in section taken along line 5—5 of FIG. 4.
Figure 6:
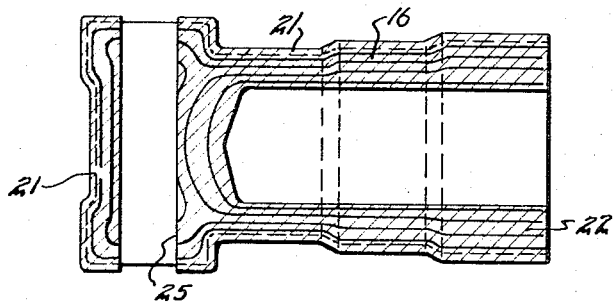
FIG. 6 is a view in section taken along line 6—6 of FIG. 4 showing a longitudinal grain flow pattern of the part made according to the invention.
Figure 8:
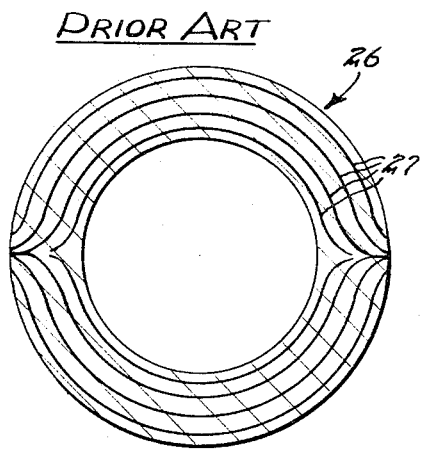
FIG. 8 is a view in cross section showing the cross sectional grain pattern of a part forged in accordance with the prior art method.

In all parts produced in accordance with the aforesaid method steps according to the invention, the flow pattern of the internal grain structure is essentially longitudinal within the part and follows closely to its surface contours. All of the short transverse grain flow which occurred in the prior art method when the die members were moved together and material was allowed to escape from the dies is now eliminated, and there is no flow of material outwardly to the surfaces along the sides. FIG. 8 shows a typical flow line pattern of a part 26 produced by the prior art method where only the short transverse flow is possible, as illustrated by the lines 27 representing the grain flow pattern. In the present invention no flashing is formed along the sides of the dies and the grain structure flow pattern of the part itself cannot terminate at seam-like areas along opposite sides. This is shown in FIG. 5 which represents a macro-etched cross-sectional view of a transverse cut through the same part 22, illustrating how the grain flow pattern is continuous near the opposite side surfaces even at the areas near the bead where the die members abutted together during the forging process. FIG. 6 illustrates how the grain flow would appear in a longitudinal macro-etched section of the part 22 made according to the present invention. It is this continuous, generally longitudinal internal grain flow pattern which provides the maximum strength and durability qualities of forgings made according to the invention, because all short transverse grain flow has been eliminated and along with it the inherent tendency for the part to crack and stress corrode in these areas.

From the foregoing it should be apparent that the present invention provides a significant step forward and solves a heretofore serious problem in the art of producing forged parts. While the present invention is particularly adaptable for use on aluminum for parts of a generally cylindrical configuration, its principles may also be applied with other alloys and for forged or wrought parts having other irregular shapes.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

A method of forging with mating dies which form an elongated cavity of desired shape comprising the steps of forming the dies along their meeting portions with mating surfaces which define a shallow groove opening into the cavity, positioning a slug of material in the cavity, exerting pressure on the slug to cause the material to flow longitudinally of the cavity and along the groove to thereby form an object with a bead, and then removing the bead.

References Cited by the Examiner
UNITED STATES PATENTS

| | | | |
|---|---|---|---|
| 1,613,595 | 1/1927 | Abel | 72—360 |
| 2,216,462 | 10/1940 | Spang | 72—340 |
| 2,261,304 | 11/1941 | Sparks | 72—344 |
| 2,465,884 | 3/1949 | Koppel | 72—364 |

CHARLES W. LANHAM, *Primary Examiner.*

L. A. LARSON, *Assistant Examiner.*